(12) United States Patent
Boonyurn

(10) Patent No.: US 7,885,024 B2
(45) Date of Patent: Feb. 8, 2011

(54) OSCILLATION TEST FOR OFF TRACK WRITE

(75) Inventor: Pirat Boonyurn, Prachinburi Province (TH)

(73) Assignee: Hitachi Global Storage Technologies, Netherlands, B.V., Amsterdam (NL)

(*) Notice: Subject to any disclaimer, the term of this patent is extended or adjusted under 35 U.S.C. 154(b) by 225 days.

(21) Appl. No.: 12/184,070

(22) Filed: Jul. 31, 2008

(65) Prior Publication Data

US 2010/0027149 A1  Feb. 4, 2010

(51) Int. Cl.
*G11B 27/36* (2006.01)

(52) U.S. Cl. .................. 360/31; 360/53; 360/75

(58) Field of Classification Search .............. None
See application file for complete search history.

(56) References Cited

U.S. PATENT DOCUMENTS

| | | | |
|---|---|---|---|
| 3,728,699 A | 4/1973 | Sordello | |
| 4,967,292 A | 10/1990 | Moteki | |
| 5,703,848 A | 12/1997 | Hofer | |
| 6,496,315 B1 | 12/2002 | Ueda et al. | |
| 6,567,233 B1 | 5/2003 | Chew et al. | |
| 6,754,030 B2 * | 6/2004 | Seng et al. ............... | 360/76 |
| 6,781,780 B1 * | 8/2004 | Codilian ................... | 360/60 |
| 6,791,780 B2 | 9/2004 | Lee et al. | |
| 6,822,814 B2 | 11/2004 | Ng | |
| 7,082,007 B2 * | 7/2006 | Liu et al. ................ | 360/77.02 |
| 7,215,497 B2 | 5/2007 | Urata | |
| 7,570,445 B2 * | 8/2009 | Alfred et al. ............... | 360/31 |
| 2007/0253096 A1 | 11/2007 | Alfred et al. | |

FOREIGN PATENT DOCUMENTS

JP  02-297702  12/1990

OTHER PUBLICATIONS

Siegel, P. "Applications if a peak detecting magnetic channel model", *Magnetics, IEEE Transactions on*, vol. 18, No. 16, (Nov. 1982),1250-1252.

Seun-Hi, Lee "Active High Frequency Vibration Rejection in Hard Disk Drives", *Proceedings of the 2004 American Control Conference* Boston, Massachusetts, (2004),517-522.

* cited by examiner

*Primary Examiner*—Jason C Olson

(57) ABSTRACT

An enhanced oscillation test for detecting off track writing associated with a read/write head writing, on a magnetic media, a measurement track. Once the measurement track is written, a series of seek, write, and read operations is performed, e.g., between various origin tracks and the tracks adjacent to the measurement track, in order to detect any off track write problems. If a measurement track read operation fails a certain number of times, then an error code is generated which indicates an off track write problem.

8 Claims, 4 Drawing Sheets

OSCILLATION TEST FOR OFF TRACK WRITE

TECHNICAL FIELD

Embodiments of the invention relate generally to the field of hard disk drives and, more specifically, to an oscillation test for detecting an off track write problem associated with a recording head.

BACKGROUND ART

Electronic computing devices have become increasingly important to data computation, analysis and storage in our modern society. Modem direct access storage devices (DASDs), such as hard disk drives (HDDs), are heavily relied on to store mass quantities of data for purposes of future retrieval. As such long term data storage has become increasingly popular, and as the speed of microprocessors has steadily increased over time, the need for HDDs with greater storage capacity to store the increased amount of data has also steadily increased.

Consequently, there are seemingly constant development efforts to improve the areal density of the media implemented in hard disk drives, where the areal density is typically measured as the product of bits per inch ("BPI") and tracks per inch ("TPI"). BPI refers to the number of bits that can be written and later reread per linear inch along a track, whereas TPI refers to the number of individual tracks per radial inch. Improvements in areal density in turn lead to higher demands and stricter requirements put on the corresponding magnetic read/write heads. Furthermore, additional and significant improvements are taking place which fundamentally change how HDDs record data onto the media, such as with perpendicular magnetic recording (PMR) and thermally assisted recording (TAR).

Such advancements in areal density result in much tighter tolerances regarding read/write head performance. That is, the precision with which the head and associated actuation system operate need to improve as areal densities increase. Consequently, more exhaustive and efficient head acceptance testing would be beneficial.

It is common for an HDD developer or manufacturer to perform oscillation testing during HDD production, to detect any seek problems associated with the magnetic read/write heads produced. Such oscillation testing procedures move the head being tested across a recording media, consecutively between one side of the media to the other side of the media and progressively from outer data blocks to inner data blocks, while writing and reading data blocks at the target locations on the disk, all the while converging toward the middle of the writeable media. The target locations with such a procedure are logical block addresses ("LBA"s). However, such oscillation tests only detect the mechanics of seek read/write problems, rather than detecting off track write problems, and with a test time on the order of 0.33 hours/head.

SUMMARY OF EMBODIMENTS OF THE INVENTION

An enhanced oscillation test for detecting off track writing associated with a read/write head is described. On a magnetic media, such as a hard disk, a measurement track is written. According to an embodiment, if the measurement track write operation fails a certain number of times, then an error code is generated which indicates an off track write problem.

Once the measurement track is written, a series of seek, write, and read operations is performed, e.g., between a varying origin track and the tracks adjacent to the measurement track, in order to detect any off track write problems. If a measurement track read operation fails a certain number of times, then an error code is generated which indicates an off track write problem.

Based on the foregoing improved oscillation test, rather than solely testing for problems associated with seek operations, testing for problems associated with off track write operations is performed. Furthermore, the test time is significantly reduced in comparison with other seek-only based oscillation tests.

BRIEF DESCRIPTION OF THE DRAWINGS

The accompanying drawings, which are incorporated in and form a part of this specification, illustrate embodiments of the invention and, together with the description, serve to explain the principles of the invention. The drawings are used merely to illustrate principles of the illustrated embodiments, and it is understood that components described in these embodiments have not been drawn to scale.

DETAILED DESCRIPTION OF EMBODIMENTS OF THE INVENTION

Figure 1:
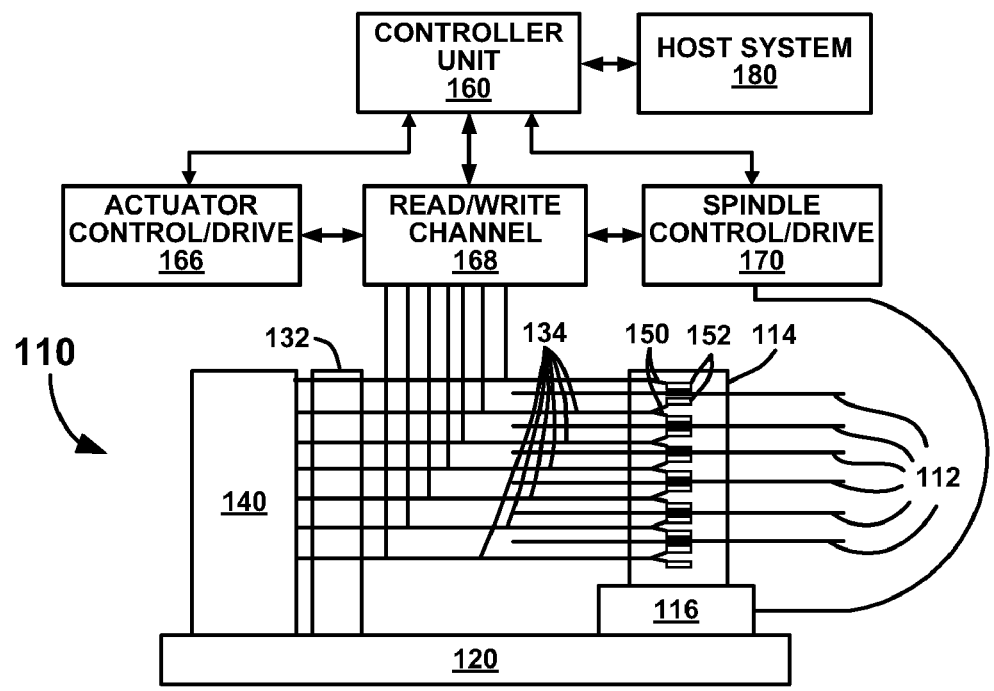
FIG. 1 illustrates a side view of a disk drive system, according to an embodiment of the invention.

Reference will now be made in detail to embodiments of the present technology, examples of which are illustrated in the accompanying drawings. While the technology will be described in conjunction with various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

OVERVIEW

An enhanced oscillation test for detecting off track write operations associated with a read/write head involves writing a measurement track and then performing a series of seek, write, and read operations in order to detect off track write problems. For example, a certain series of seek and write operations is performed while oscillating between a varying origin track and the tracks adjacent to the measurement track, followed by a series of read operations of the measurement track. If the measurement track read operation fails a certain number of times, then an error code is generated which indicates an off track write problem.

Based on the foregoing improved oscillation test, rather than solely testing for problems associated with seek operations, testing for problems associated with off track write operations is performed. Furthermore, the test time is significantly reduced in comparison with other seek-only based oscillation tests.

It should be understood by those skilled in the art that various embodiments of the invention enhance the hard disk drive development and manufacturing process by more accurately and efficiently detecting off track write problems associated with read/write heads. Although embodiments of the invention are described in conjunction with a magnetic read/write head in a hard disk drive, it is understood that the embodiments described herein may be useful outside of the art of HDD design, manufacturing and operation. The utilization of the HDD magnetic read/write head example is only one embodiment and is provided herein merely for purposes of brevity and clarity.

Numerous specific embodiments are herein set forth in detail to provide a more thorough understanding of the present technology. The discussion of these detailed embodiments begins with an overview of a hard disk drive (HDD) and the components connected therein. The discussion then focuses on embodiments of the invention that provide an improved oscillation test for detecting off track write problems associated with a read/write head.

Hard Disk Drive (HDD) Configuration

Figure 2:
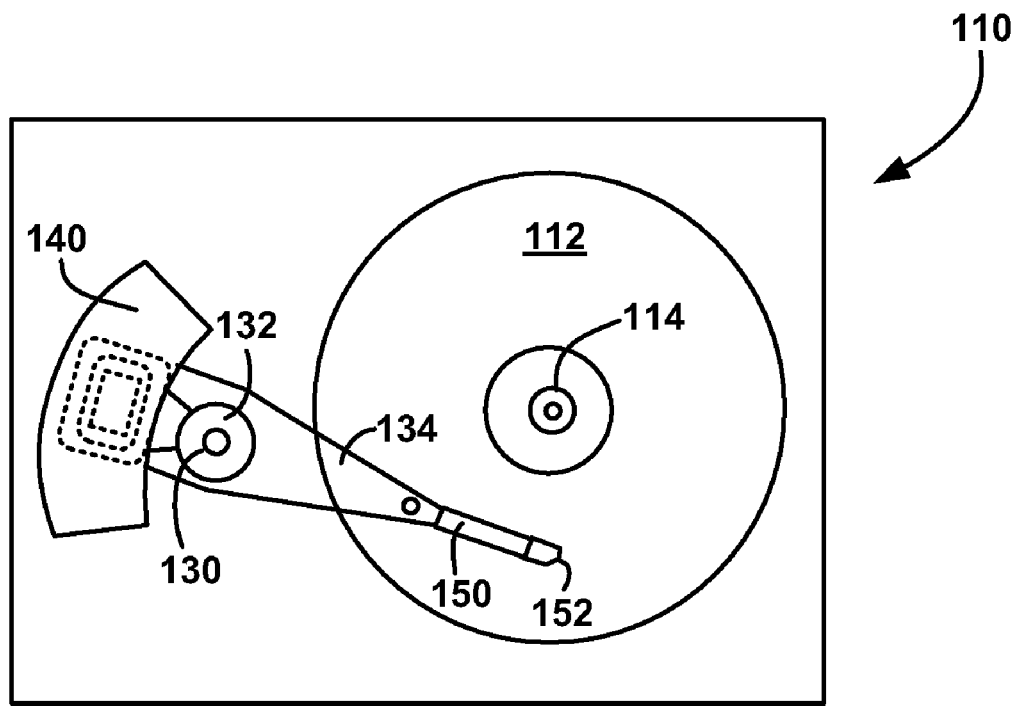
FIG. 2 illustrates a top view of a disk drive system, according to an embodiment of the invention.

FIG. 1 and FIG. 2 show a side view and a top view, respectively, of a disk drive system designated by the general reference number 110. The disk drive system 110 comprises a plurality of stacked magnetic recording disks 112 mounted to a spindle 114. The disks 112 may be conventional thin film recording disks or other magnetically layered disks. The spindle 114 is attached to a spindle motor 116, which rotates the spindle 114 and disks 112. A chassis 120 provides a housing for the disk drive system 110. The spindle motor 116 and an actuator shaft 130 are attached to the chassis 120. A hub assembly 132 rotates about the actuator shaft 130 and supports a plurality of actuator arms 134. A rotary voice coil motor 140 is attached to chassis 120 and to a rear portion of the actuator arms 134.

A plurality of suspension assemblies 150 are attached to the actuator arms 134. A plurality of heads or transducers on sliders 152 are attached respectively to the suspension assemblies 150. The sliders 152 are located proximate to the disks 112 so that, during operation, the heads or transducers are in electromagnetic communication with the disks 112 for reading and writing. The rotary voice coil motor 140 rotates actuator arms 134 about the actuator shaft 130 in order to move the suspension assemblies 150 to the desired radial position on disks 112. The shaft 130, hub 132, arms 134, and motor 140 may be referred to collectively as a rotary actuator assembly.

A controller unit 160 provides overall control to system 110. Controller unit 160 typically includes (not shown) a central processing unit (CPU), a memory unit and other digital circuitry and executable instructions, although it should be apparent that one skilled in the computer arts could also enable these aspects as firmware logic. Controller unit 160 is connected to an actuator control/drive unit 166 that in turn is connected to the rotary voice coil motor 140. This configuration also allows controller 160 to control rotation of the disks 112. A host system 180, typically a computer system, is connected to the controller unit 160. The host system 180 may send digital data to the controller 160 to be stored on disks 112, or it may request that digital data at a specified location be read from the disks 112 and sent to the system 180. The basic operation of DASD units is well known in the art and is described in more detail in The Magnetic Recording Handbook, C. Dennis Mee and Eric D. Daniel, McGraw-Hill Book Company, 1990.

Oscillation Test for Detecting Off Track Write Problems

Figure 3:
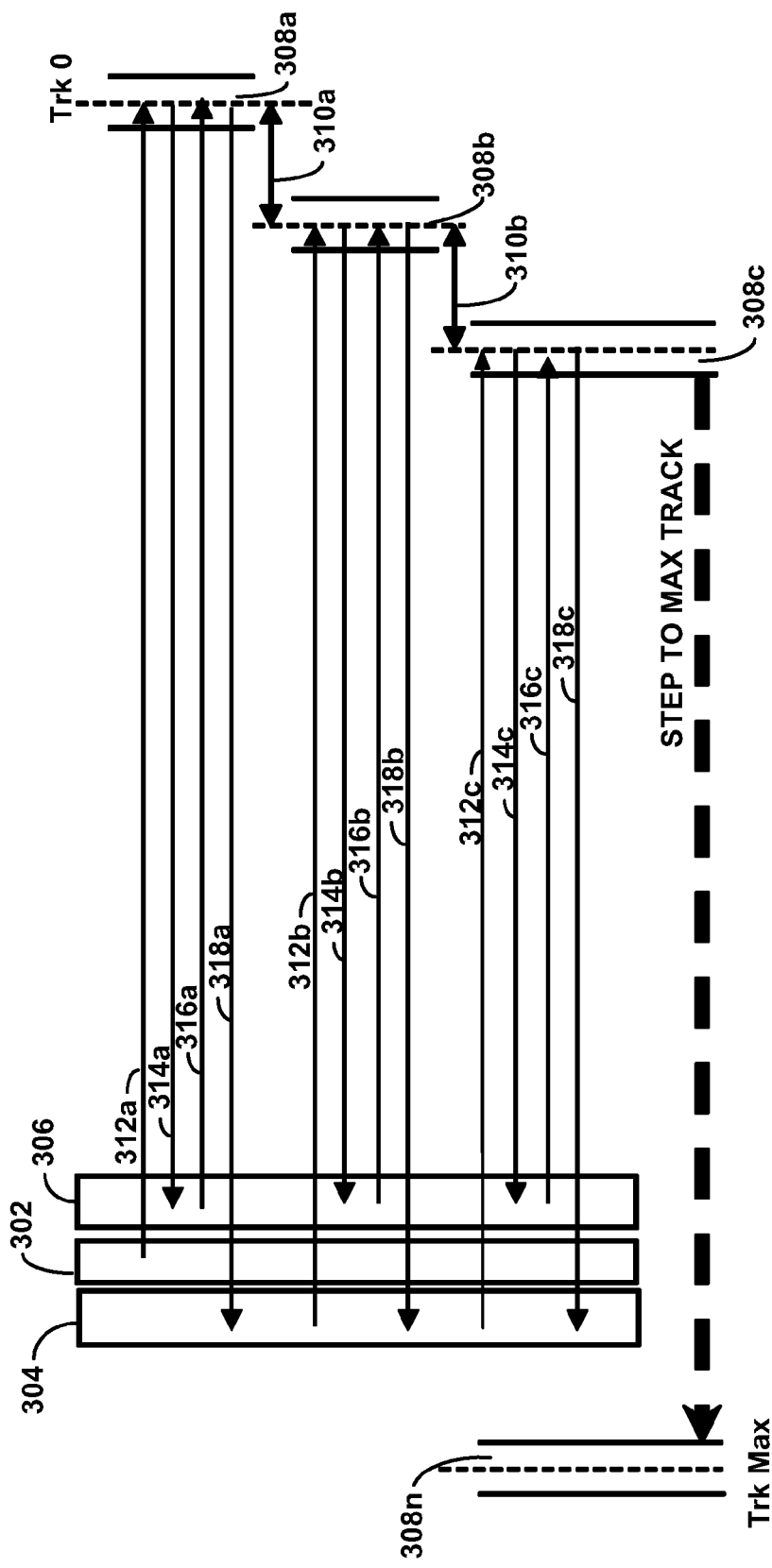
FIG. 3 is a graph illustrating an oscillation test for detecting off track write problems associated with a read/write head, according to an embodiment of the invention.

FIG. 3 is a graph illustrating an oscillation test for detecting off track write problems associated with a read/write head, according to an embodiment of the invention. The graph of FIG. 3 depicts data tracks on a media, such as a magnetic hard disk, as well as a series of head operations performed in conjunction with the media. The data tracks depicted encompass the range of writeable tracks on the media, i.e., from the first track, track 0 ("Trk 0"), to the last track ("Trk Max").

Depicted in the graph of FIG. 3 is a measurement track 302 with its adjacent tracks, which are adjacent track 304 and adjacent track 306. Also depicted are various origin tracks, which are origin track 308a (Trk 0), origin track 308b, origin track 308c, and origin track 308n (Trk Max), where the number of origin tracks depends on the maximum number of tracks on the media. Use of the letter "n" in 308n is simply used to represent a variable number of origin tracks based on the maximum number of tracks on the given media used in the oscillation test of FIG. 4. Successive origin tracks are separated by respective track skip ranges, which are skip range 310a and skip range 310b. Also depicted in FIG. 3 is a series of operations referenced as 312a, 314a, 316a, 318a, 312b, 314b, 316b, 318b, 312c, and so on. These operations are described in more detail in reference to the oscillation test of FIG. 4.

Figure 4:
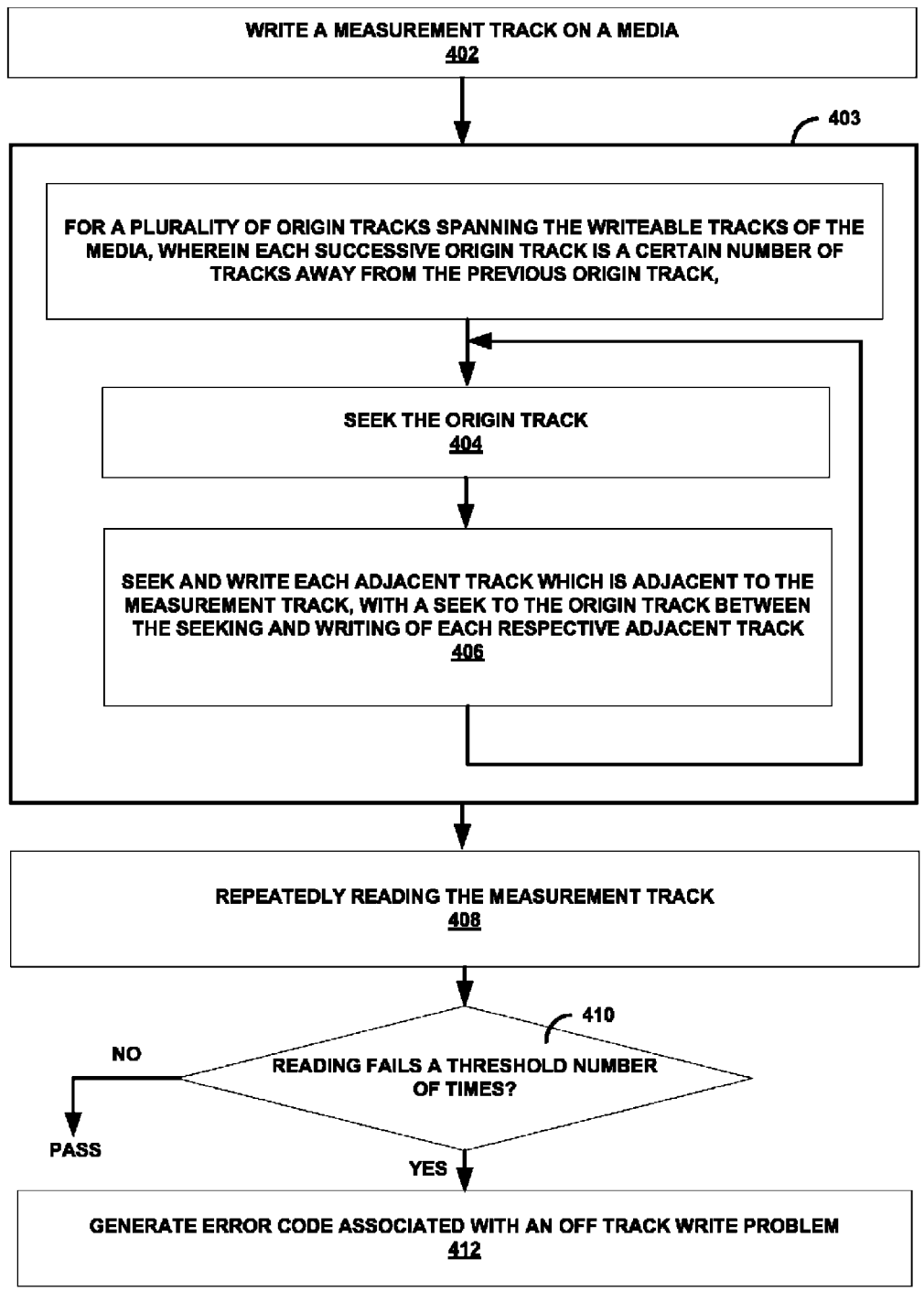
FIG. 4 is a flow diagram illustrating a method for detecting off track write problems associated with a read/write head, according to an embodiment of the invention.

FIG. 4 is a flow diagram illustrating a method for detecting off track write problems associated with a read/write head, according to an embodiment of the invention. The method depicted in FIG. 4 may be implemented as a head testing procedure in a hard disk drive manufacturing process.

At block 402, a measurement track is written on a media. For example, measurement track 302 (FIG. 3) is written to the media. The location at which the measurement track is written may vary from implementation to implementation, i.e., as long as the measurement track is written somewhere between the first and last tracks of the media. According to an embodiment, the measurement track written at block 402 is written along the entire track, i.e., from the start of track (SOT) to the end of track (EOT).

According to an embodiment, if the measurement track write operation fails a certain threshold number of times, then an error code is generated which is associated with an off track write problem. According to a related embodiment, if the measurement track write operation fails ten times, then a particular error code is generated. However, the threshold number of write operation failures may vary from implementation to implementation.

Once the measurement track is successfully written, the method enters a loop 403, for a plurality of origin tracks spanning the writeable tracks of the media, wherein each successive origin track is a certain number of tracks away from the previous origin track. For example and in reference to FIG. 3, the processing loop is from the first writeable track, e.g., origin track 308a (Trk 0), to the last writeable track, e.g., origin track 308n (Trk Max), with respective track skip ranges 310a, 310b, and so on. According to an embodiment, each track skip range (e.g., skip range 310a and skip range 310b) is equal to the quotient of the maximum number of writeable tracks on the media over one thousand (max_trk/1000). As such, the origin tracks are max_trk/1000 tracks apart and, likewise, each run through the processing loop corresponds to a "next" origin track which is max_trk/1000 away from the previous origin track.

Within loop 403, at block 404 a seek operation to the origin track is performed. For example, at operation 312a, a seek operation to the current origin track 308a is performed.

Within loop 403, at block 406 seek and write operations to each of the adjacent tracks are performed with a seek operation to the origin track performed between each adjacent track seek/write. For example, (a) at operation 314a, a seek operation to the first adjacent track 306 (e.g., the adjacent track that is closer to the origin track) is performed followed by a write operation to the first adjacent track 306; (b) at operation 316a, a seek operation back to the current origin track 308a is performed; and (c) at operation 318a, a seek operation to the second adjacent track 304 (e.g., the adjacent track that is farther from the origin track) is performed followed by a write operation to the second adjacent track 304. While the foregoing example discussed seeking and writing to the closer adjacent track and then seeking and writing to the farther adjacent track, such order may be varied, by which the farther adjacent track is first and the closer adjacent track is second. According to an embodiment, the adjacent tracks written at block 406 are written along the entire respective tracks, i.e., from the start of track (SOT) to the end of track (EOT).

Because blocks 404, 406 are within loop 403, blocks 404 and 406 are iteratively performed until the last track, or maximum track (Trk Max), is reached, while incrementing the origin track by the certain number of tracks referred to as the skip range, such as skip range 310a, 310b, etc. For example, (a) at operation 312b, a seek operation to the new origin track 308b is performed (block 404); (b) at operation 314b, a seek operation to the first adjacent track 306 is performed followed by a write operation to the first adjacent track 306; (b) at operation 316b, a seek operation back to the current origin track 308b is performed; and (c) at operation 318b, a seek operation to the second adjacent track 304 is performed followed by a write operation to the second adjacent track 304. As depicted in FIG. 3 the origin track is again incremented, from origin track 308b by an amount of range 310b to origin track 308c, and operations 312c, 314c, 316c, and 318c are performed. This process continues until the tracks run out.

Now exiting loop 403, at block 408 the measurement track is repeatedly read. For example, measurement track 302 is read multiple times while the number of read failures is tracked. At decision block 410, if the number of measurement track read failures is less than a certain threshold number of times, then no error code is generated and the head passes the off track write test.

At decision block 410, if the number of measurement track read failures equals or exceeds a certain threshold number of times, then at block 412 an error code is generated which indicates an off track write problem. According to an embodiment, the measurement track is repeatedly read one hundred times, whereby an error code is generated if the number of measurement track read failures equals or exceeds five times (e.g., a 5% failure threshold). The number of measurement track reads and the failure threshold number, as well as their relative percentage, may vary from implementation to implementation.

According to an embodiment, the foregoing off track write detection method of FIG. 4 is embodied in computer code, e.g., computer software or firmware. That is, the off track write detection method may be implemented in a computer-readable medium storing sequences of instructions which, when executed by one or more processors, cause performance of the actions corresponding to blocks 402-412 of FIG. 4. For example, such instructions may be executable by a processor constituent to a general purpose computer or a special purpose computer programmed to perform the disclosed embodiment, such as a magnetic read/write head testing instrument.

Based on the foregoing oscillation test described in reference to FIGS. 3 and 4, testing for problems associated with off track write operations is performed. Furthermore, the test time is significantly reduced in comparison with other seek-only based oscillation tests. For example, the foregoing test has been performed on the order of 0.05 hours/head in comparison with 0.33 hours/head for a seek-only based test.

It should be understood that although various embodiments of the present invention are described in the context of a test procedure for a hard disk drive (HDD), the foregoing embodiments are merely exemplary of various implementations of principles of the present technology. Therefore, it should be understood that various embodiments of the invention described herein may apply to any devices, configurations, or systems in which magnetic read/write heads are employed.

The foregoing descriptions of specific embodiments of the present invention have been presented for purposes of illustration and description. They are not intended to be exhaustive or to limit the invention to the precise forms disclosed, and many modifications and variations are possible in light of the above teachings. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of detecting an off track write problem associated with a read/write head, the method comprising:
    writing a measurement track on a media;
    for a plurality of origin tracks spanning the writeable tracks of said media, wherein each successive origin track is a certain number of tracks away from the previous origin track, repeatedly
    seeking said origin track;
    seeking and writing each adjacent track which is adjacent to said measurement track, with a seek to said origin track between said seeking and writing of each respective adjacent track;
    repeatedly reading, up to a certain number of times, said measurement track; and
    if said reading fails at least a first threshold number of times, then generating a first error code associated with an off track write problem.

2. The method recited in claim 1, further comprising:
    if said writing a measurement track fails a second threshold number of times, then generating a second error code associated with an off track write problem.

3. The method recited in claim 1, wherein said certain number equals one hundred and wherein said first threshold equals five.

4. The method recited in claim 1, wherein said first threshold is approximately five percent of said certain number.

5. The method recited in claim 1, wherein said writing a measurement track and said reading said measurement track are performed from start of track to end of track.

6. The method recited in claim 1, wherein said writing each adjacent track is performed from start of track to end of track.

7. The method recited in claim 1, wherein said certain number of tracks equals the quotient of said maximum number of tracks on said media divided by one thousand.

8. The method recited in claim 1, wherein said seeking and writing each adjacent track comprises seeking and writing said adjacent track closest to said origin track followed by seeking and writing said adjacent track farthest from said origin track.

* * * * *